(12) United States Patent
Moreau et al.

(10) Patent No.: US 9,400,162 B2
(45) Date of Patent: Jul. 26, 2016

(54) DEVICE FOR MEASURING AN INTERNAL OR EXTERNAL PROFILE OF A TUBULAR COMPONENT

(71) Applicants: VALLOUREC OIL AND GAS FRANCE, Aulnoye-Aymeries (FR); NIPPON STEEL & SUMITOMO METAL CORPORATION, Chiyoda-ku (JP)

(72) Inventors: Regis Moreau, Avesnes sur Helpe (FR); Pierre Martin, Marly (FR)

(73) Assignees: VALLOURE OIL AND GAS FRANCE, Aulnoye-Aymeries (FR); NIPPON STEEL & SUMITOMO METAL CORPORATION, Chiyoda-ku (JP)

( * ) Notice: Subject to any disclaimer, the term of this patent is extended or adjusted under 35 U.S.C. 154(b) by 56 days.

(21) Appl. No.: 14/369,365

(22) PCT Filed: Dec. 26, 2012

(86) PCT No.: PCT/FR2012/000551
§ 371 (c)(1),
(2) Date: Jun. 27, 2014

(87) PCT Pub. No.: WO2013/098493
PCT Pub. Date: Jul. 4, 2013

(65) Prior Publication Data
US 2014/0360036 A1   Dec. 11, 2014

(30) Foreign Application Priority Data
Dec. 29, 2011  (FR) ...................................... 11 04149

(51) Int. Cl.
| | |
|---|---|
| *G01B 5/20* | (2006.01) |
| *G01B 21/10* | (2006.01) |
| *G01B 21/14* | (2006.01) |
| *G01B 5/08* | (2006.01) |
| *G01B 5/12* | (2006.01) |
| *G01B 7/12* | (2006.01) |
| *G01B 7/13* | (2006.01) |
| *G01B 11/08* | (2006.01) |
| *G01B 11/12* | (2006.01) |

(52) U.S. Cl.
CPC .. *G01B 5/20* (2013.01); *G01B 5/08* (2013.01); *G01B 5/12* (2013.01); *G01B 7/12* (2013.01);
(Continued)

(58) Field of Classification Search
CPC .............. G01B 5/08; G01B 5/12; G01B 5/20; G01B 7/12; G01B 7/13
USPC ................. 33/542, 543, 550, 551, 555, 555.1
See application file for complete search history.

(56) References Cited

U.S. PATENT DOCUMENTS 4,297,034 A    10/1981  Ito et al.
4,307,514 A *  12/1981  Ange ..................... G01B 21/14
                                                    33/543.1

(Continued)

FOREIGN PATENT DOCUMENTS

CN      101258380 A     9/2008
EP      2 194 358 B1    6/2011

OTHER PUBLICATIONS

International Search Report issued Mar. 18, 2013, in PCT/FR12/000551 filed Dec. 26, 2012.

*Primary Examiner* — G. Bradley Bennett
(74) *Attorney, Agent, or Firm* — Oblon, McClelland, Maier & Neustadt, L.L.P.

(57) ABSTRACT

A device includes a first sensor for making a radial measurement of a tubular component and a support which can drive the first sensor in a circular trajectory in a predefined plane orthogonal to the principal axis of the component. The support includes a principal body that can be attached to the component by a releasable attachment mechanism and a rotary shaft onto which an arm carrying the first sensor is attached to allow displacement of the first sensor in a circular trajectory inside or about the component. The device further includes a second sensor for measuring an angular position of the first sensor for each of its radial measurements, the radial and angular measurements obtained allowing the profile of the component in the predefined plane to be determined.

11 Claims, 3 Drawing Sheets

(52) U.S. Cl.
CPC  *G01B 7/13* (2013.01); *G01B 11/08* (2013.01); *G01B 11/12* (2013.01); *G01B 21/10* (2013.01); *G01B 21/14* (2013.01)

(56) References Cited

U.S. PATENT DOCUMENTS

| | | | |
|---|---|---|---|
| 4,521,968 A | 6/1985 | Wiltermood et al. | |
| 4,821,425 A | 4/1989 | Currie et al. | |
| 5,485,678 A | 1/1996 | Wagg et al. | |
| 2001/0029677 A1* | 10/2001 | Bidwell | G01B 5/0004 33/542 |
| 2009/0144999 A1* | 6/2009 | Lau | G01B 5/12 33/544.1 |
| 2014/0109419 A1* | 4/2014 | Shindo | G01B 5/008 33/502 |
| 2015/0168139 A1* | 6/2015 | Matlapudi | G01B 21/14 73/112.01 |
| 2015/0267528 A1* | 9/2015 | Marpaung | G01B 7/13 73/1.81 |

* cited by examiner

DEVICE FOR MEASURING AN INTERNAL OR EXTERNAL PROFILE OF A TUBULAR COMPONENT

The present invention relates to a device for measuring an internal or external profile of a tubular component. More particularly but not exclusively, it is applicable to measuring the internal or external profile of tubular components intended for oil or gas working.

Such a tubular component generally comprises a male or female type threaded end which can be made up with a respectively female or male type end of another tubular component. The presence of defects in thickness or circularity of such tubes is thus particularly critical, in particular when the components have to be connected together in a satisfactory manner. Thus, the presence of such defects may generate fatigue and thus cracks in the tubular components at the connection between the defective tubular components. Furthermore, such dimensional defects risk causing problems with the seals as the values for the radial interference at the sealing surfaces and the threadings are not at optimized levels for ensuring that the connection provides a seal. Finally, when the threadings have dimensions exceeding the desired dimensional tolerances, there is a risk of rupture of the tube string during working of the well.

As a consequence, the quality of such tubular components is inspected after they have been manufactured. Inspection essentially consists of measuring the diameters in order to detect any ovality. Components exhibiting such defects must thus be identified and may be rejected.

It is necessary to check that the dimensional characteristics of the manufactured component fall within a series of pre-defined acceptable tolerances. Such inspection operations are essential in order to be able to identify any defective tubular components which have to be rejected. Such quality control operations must be as precise as possible, repeatable and efficient.

A gauge is already known in the prior art which can measure the internal or external diameters of a tubular component. That tool comprises a support carrying two contact members: one is fixed and one is mobile. The support is arranged such that the two contact members are disposed one facing the other on the component to be tested and at a distance which can be adjusted to allow the tool to be adapted as a function of the diameter of the component. Next, the operator pre-adjusts the distance separating the two members on a calibration component with an ideal profile and places the support on the component to be tested. A needle indicator can be used to read the result of the measurement corresponding to the displacement of the mobile contact member with respect to the reference measurement made during the calibration.

In order to detect a defect in circularity, the operator turns the tool in an individual axial plane about the tubular component to determine a minimum diameter and a maximum diameter. If the distance between these two measurements is too large compared with the desired tolerances, the component is then rejected. The disadvantage of that tool is that it requires the operator to be experienced in order to make a reliable and reproducible measurement. Rotation of the tool about the component necessitates a great deal of practice to keep the tool in the axial plane as well as on a diameter of the circle rather than on a chord of an arc of a circle. Thus, the measurements vary from one operator to another depending on the experience of the operator; thus, they are not very reliable.

The prior art, in particular the document EP 2 194 358, also shows that a measuring device is known which comprises an optical sensor mounted on a support, the support being fixed on a bench. That device is thus not well suited to carrying out rapid and efficient measurements of different tubular components, primarily because it is complicated to use.

Thus, there exists a need to provide a measuring device, in particular for the internal or external profiles of tubular components, that is easy to manipulate and to transport, which allows reliable measurements to be made independently of the operator making the measurements.

To this end, the invention provides a device for measuring an external or internal profile of an end portion of a tubular component, comprising a first sensor for making a radial measurement of the tubular component with respect to a pre-defined reference and a support which can drive the first sensor in a circular trajectory in a pre-defined plane orthogonal to the principal axis of the component, characterized in that the support comprises a principal body that can be attached to the component via releasable attachment means and a shaft which is movable in rotation with respect to the body on which an arm carrying the first sensor is attached to allow displacement of the first sensor in a circular trajectory inside or about the tubular component, and in that the device comprises a second sensor for measuring an angular position of the first sensor for each radial measurement of the first sensor, the radial and angular measurements of the first and second sensors allowing the profile of the component in the pre-defined plane to be determined.

Because of the invention, since the support is attached via releasable attachment means, it is a simple matter to relocate the measuring device from one component to another. Further, the reliability of the measurements is independent of the operator since, once the support is attached to the component, it simply remains to rotate the shaft which will then drive the radial and angular measurement sensors in rotation with it. These two measurements, which completely determine a point in a set of polar coordinates, mean that an external (respectively internal) profile of the component can be reproduced. Thus, precision is increased.

Further, the device is readily transportable from one component to another primarily by means of the releasable attachment means with which the support is attached to the component.

Preferably, the first sensor is of the contact or contactless type, for example of the inductive type or of the optical detection type.

In a preferred embodiment, the arm is configured to allow adjustment of the sensor in axial and radial translation with respect to the component.

Adjusting the first sensor in axial and radial translation facilitates adaptation of the measuring device to different tube diameters but also, for the same tube, facilitates adaptation of the device to the internal or external profile measurements of the component.

Preferably, the device comprises actuating means of the crank type to drive the shaft in rotation. This simple arrangement means that any operator can use the device without any prior knowledge. Further, by means of the invention, the operator has a great deal of freedom as regards the rate of rotation of the shaft and acceleration. Thus, this device is very easy to use.

Preferably, the principal body comprises an upright along which the position of the releasable attachment means can be adjusted. Similarly, because of these adjustment means, it is easy to adapt the measuring device to different existing tube types.

Preferably, the releasable attachment means comprise clamping lugs which can clamp the component on the inside or outside. Thus, during the course of internal (respectively external) profile measurements, the presence of the attachment means does not perturb the trajectory of the first sensor.

Preferably, the device comprises comprising means for communicating with a unit for computing a two-dimensional profile from radial and angular measurements respectively provided by the first and second sensors.

In a preferred embodiment, the second sensor comprises a first fixed element which is integral with the principal body and a second element which is mobile in rotation with respect to the first element and which is mounted on the rotary shaft.

Preferably, the second sensor is an incremental rotary encoder.

The invention also provides a method for measuring an internal (respectively external) profile of a tubular component using a device of the invention, comprising the following steps of:
fixing the principal body of the support for the measuring device to the component using the releasable attachment means such that the shaft substantially coincides with the principal axis of the tubular component;
rotating the shaft to collect a plurality of radial measurements of an internal (respectively external) profile of the tubular component and a plurality of angular measurements corresponding to the plurality of radial measurements;
computing an internal (respectively external) profile of the tubular component using the collected radial measurements and angular measurements.

Preferably, a series of measurements is produced in a plurality of planes along the principal axis of the tubular component. Thus, the profile of the tubular component can be determined in three dimensions.

In a preferred embodiment, starting from the series of measurements obtained in different planes, a digital model of the internal or external profile of the tubular component is produced using a computer program and a finite element computation is carried out on the digital model to determine the behaviour of the component as a function of at least one physical constraint.

Further characteristics and advantages of the invention will become apparent from the following description made with reference to the accompanying drawings in which:

FIGS. 1 to 4 represents a unit for inspecting a tubular component. This unit is designated by the general reference 10.

Figure 1:
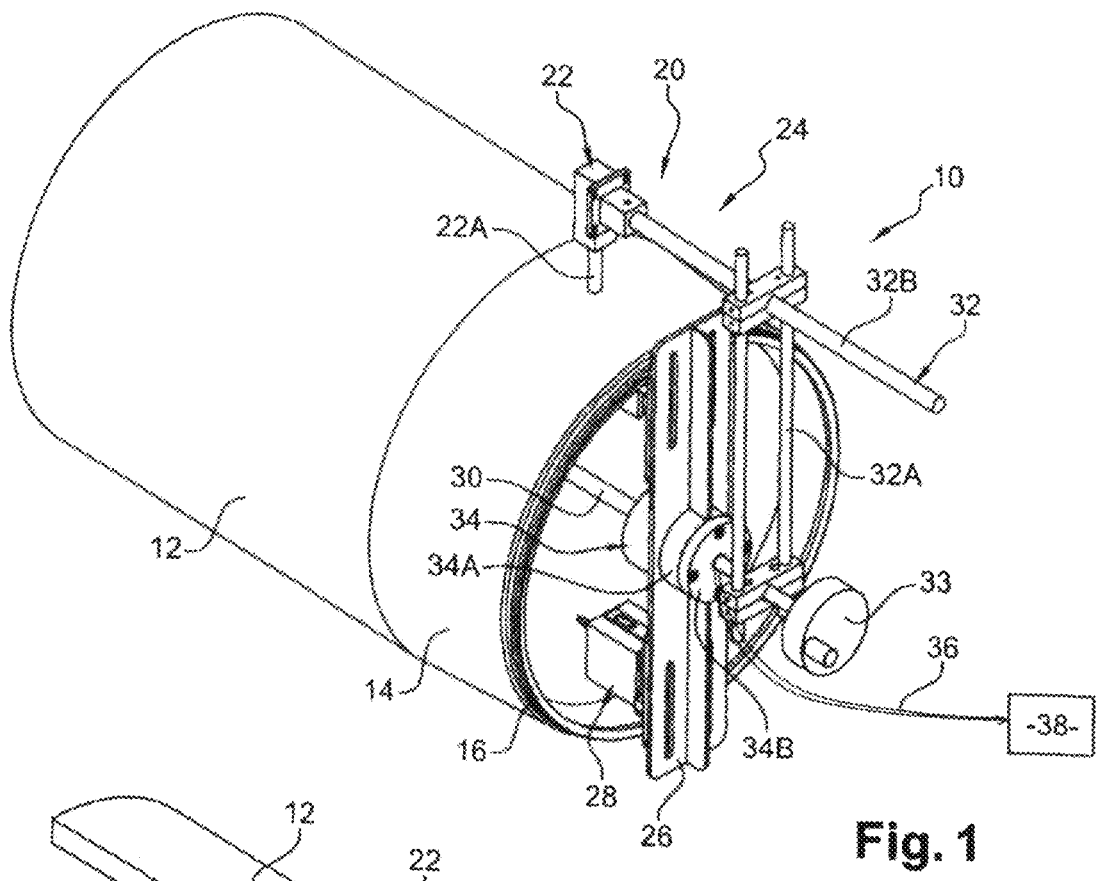
FIG. 1 represents a perspective view of a tubular component and a measuring device of the invention in a first configuration of the measuring device.
Figure 2:
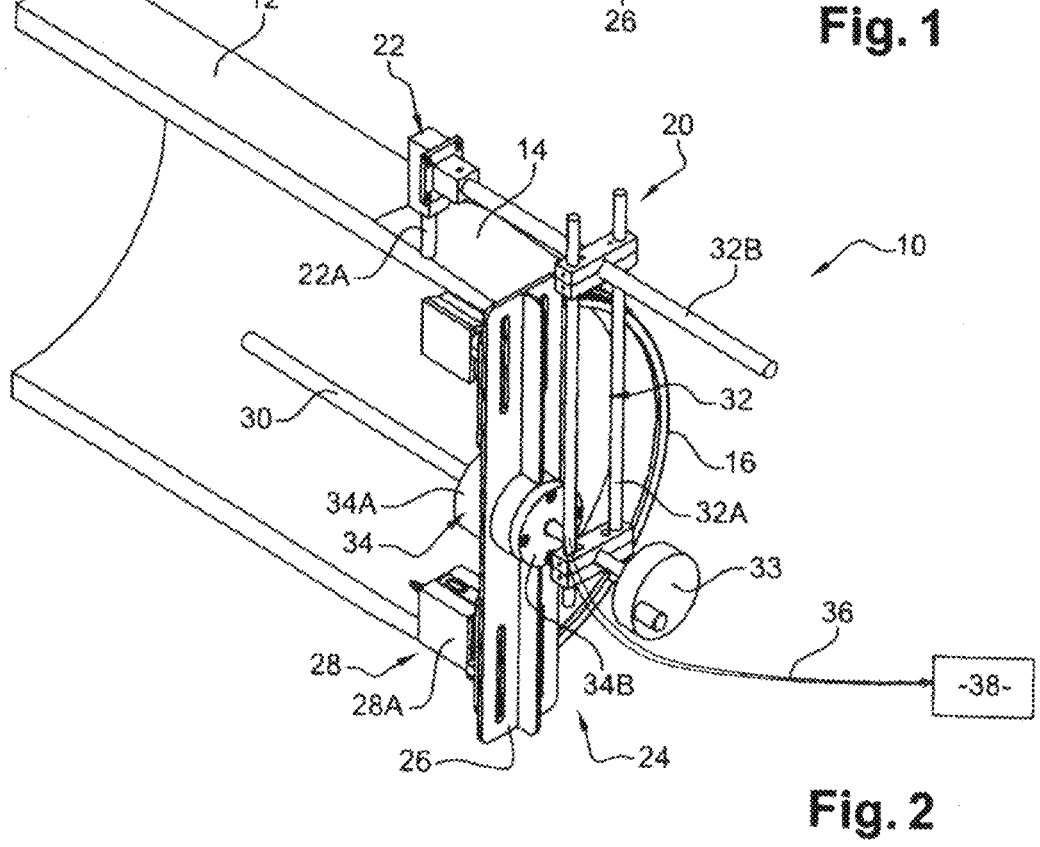
FIG. 2 represents a cutaway perspective view of the device of FIG. 1.
Figure 3:
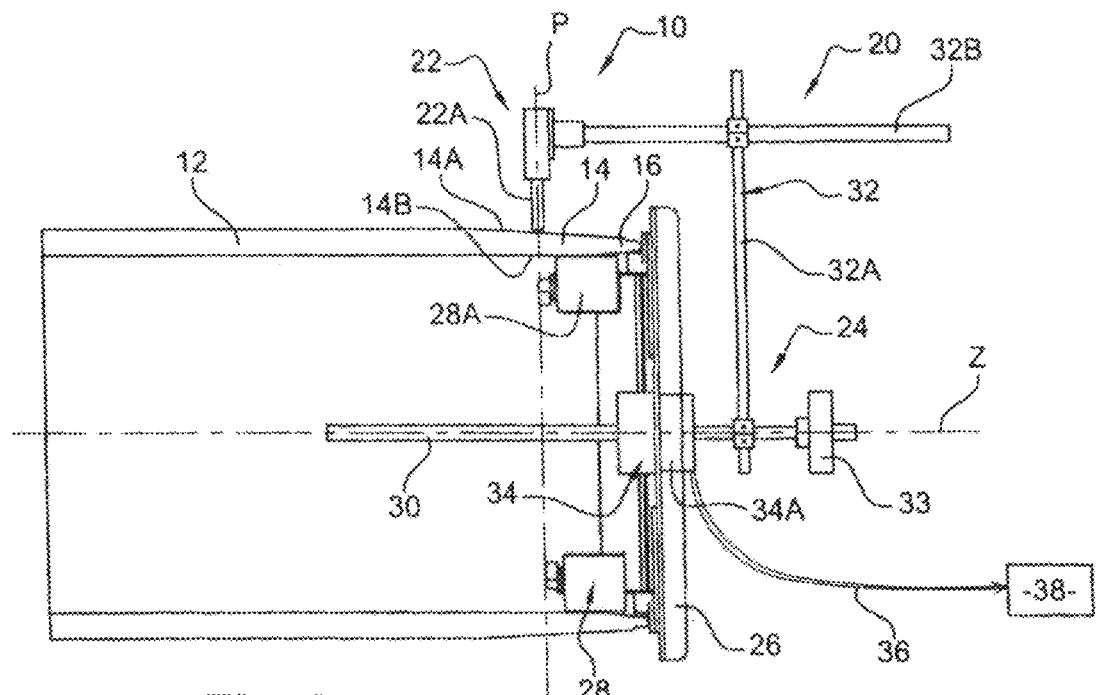
FIG. 3 represents a cross sectional view of the component and device of FIG. 1.
Figure 5:
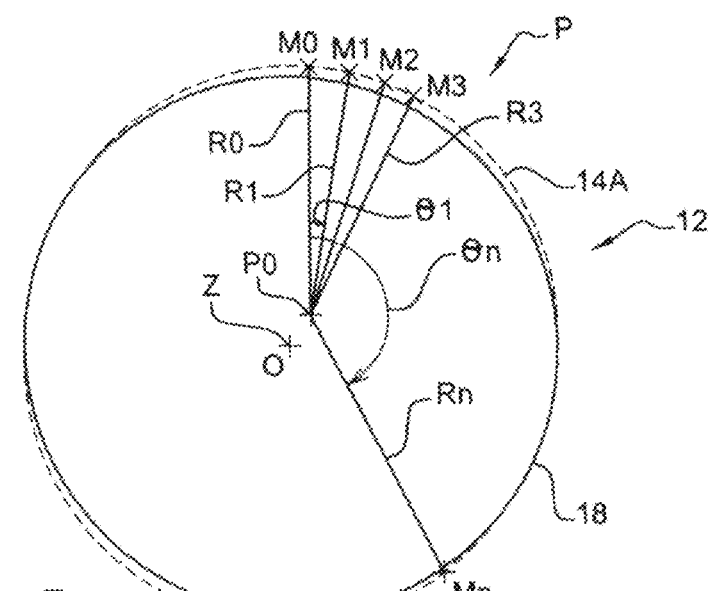
FIG. 5 represents a diagrammatic view of an external profile of the tubular component of FIGS. 1 to 3 in a measurement plane P represented in FIG. 4.

This example describes a unit 10 for inspecting a tubular component 12 comprising an end portion 14 with external 14A and internal 14B profiles. The end portion 14 of said component 12 is generally threaded to allow connection with another tubular component (not shown) by makeup. In the example illustrated in the figures, the tubular component 12 comprises a male end 16. Said tubular component is generally a few meters long. Said tubular component 12 comprises a body of revolution about a principal axis Z (FIG. 3). The internal 14B (respectively external 14A) profile of the component 12 is defined as being an envelope of the component 12, i.e. an internal (respectively external) envelope of the component about the axis Z of the component 12. Ideally, the internal 14B or external 14A profile of component 12 in a plane orthogonal to the axis is perfectly circular. In reality, this contour is not perfectly circular and may in particular exhibit ovality, as shown in FIG. 5. In this figure, the ideal external profile 14A is represented in dashed lines and the actual internal profile 14A is shown as a continuous line. The component may also have defects in its radial thickness (not shown).

As can be seen in FIGS. 1 to 4, the inspection unit 10 comprises a measuring device 20 in accordance with the invention. Said device 20 is intended to measure the external 14A or internal 14B profile of the end portion 14 of the component 12. In a first measuring configuration illustrated in FIGS. 1 to 3, the device 20 is intended to measure the external profile 14A of the component 12. In a second measuring configuration illustrated in FIG. 4, the device 20 is intended to measure the internal profile 14B of the component 12. We shall now describe the device 20 in these two configurations in detail. In these figures, analogous elements are designated by identical references.

In particular, said device 20 comprises a first sensor 22 for measuring a radial measurement of the tubular component 12 in a pre-defined plane orthogonal to the principal axis Z. This measurement plane will henceforth be denoted as P. The term "radial measurement" thus means a measurement of a distance in a radial direction of the tubular component 12, i.e. a direction perpendicular to the principal axis Z of the component 12, between a measurement point M on the external 14A (or internal 14B) profile of component 12 in the plane and a measurement reference point P0 also in the plane P. Thus, the external profile 14A of the component 12 to be inspected has been shown in the measurement plane P in FIG. 5. It is important to note that the reference point P0 for measurements made with the first sensor 22 for radial measurements does not have to be superimposed on the central point "O" of the external or internal profile of the component 12. Thus, it can be seen in FIG. 5 that the point "O" corresponding to the geometrical centre of the external profile 14A shown diagrammatically is distinct from the point "P0" which is the origin of the measurements.

The first sensor 22 is intended to be displaced about an external profile 14A or inside an internal profile 14B to carry out radial measurements. To this end, the device 20 comprises a support 24 that can drive the first sensor 22 in a pre-defined circular trajectory in the plane of measurement P.

In the example described, the sensor 22 is a contact type sensor, for example of the inductive type. The sensor 22 preferably comprises a measuring head 22A that can follow the contour of the external 14A or internal 14B profile of the component 12. Said first sensor 22 is, for example, an inductive linear displacement sensor which functions in accordance with the differential measurement principle. With this type of differential measurement sensor, a calibration should be carried out so that variations in the displacement of the sensor can be measured with respect to a reference value. Clearly, the invention is not limited to this type of sensor and other sensors may be suitable for this application, such as an optical sensor, a contactless sensor, etc.

In order to allow case of manipulation of this device 20, the support 24 comprises a principal body 26 that can be fixed to the component 12 using releasable attachment means 28. In the example illustrated in FIGS. 1 to 4, the support 24 is fixed to an internal end border of the tubular component 12. Thus, advantageously, the device 20 is fixed to the component 12 and may be readily installed on any other component. The support for the measuring device is advantageously integrally attached to the component.

Preferably and as illustrated in FIGS. 1 to 4, the principal body 26 comprises an upright 26A, designed to extend in a radial direction of the component 12 along which the position of the releasable attachment means 28 can be adjusted. This means that the device 20 can be adapted to the dimensions of different tubular components. Further, and preferably, the releasable attachment means 28 comprise clamping lugs 28A which can clamp the component 12 to the inside or outside. This facilitates adaptation of the device 20 from one measuring configuration to another of the device.

In the example illustrated for the external profile measurement, since the clamping lugs 28A clamp the component 12 from the inside, the circular trajectory of the first sensor 22 about the tubular component 12 is not in any way disturbed by the presence of said clamping lugs 28A and thus more generally by the releasable attachment means 28 which are inside the component 12. In contrast, in FIG. 4, we see, in contrast, that the lugs 28A clamp the component 12 from the outside, meaning that a free path is provided for the sensor 22 inside the component 12.

In order to be able to drive the radial measurement sensor 22 in rotation, the device 20 comprises a rotary shaft 30 on which an arm 32 which carries the first sensor 22 is fixed. Preferably, in the preferred embodiment of the invention, the device 20 comprises an actuation means 33 of the crank type to drive the shaft 30 in rotation. Thus, the measuring device may be used by an operator simply by manipulating the crank 33.

Preferably, the arm 32 is configured to allow the sensor 22 to be adjusted with respect to the component in radial and axial translation. Thus, in the example illustrated in FIGS. 1 to 4, the arm 32 comprises a first portion 32A extending perpendicular to the shaft 30 and integral to the shaft 30. In the particular measurement configuration illustrated in FIGS. 1 to 3, the arm 32 comprises a second portion 32B which extends parallel to the shaft 30, on which the first sensor 22 is mounted. Preferably, said second portion 32B is movable in axial and radial translation with respect to the first portion 32A.

Figure 4:
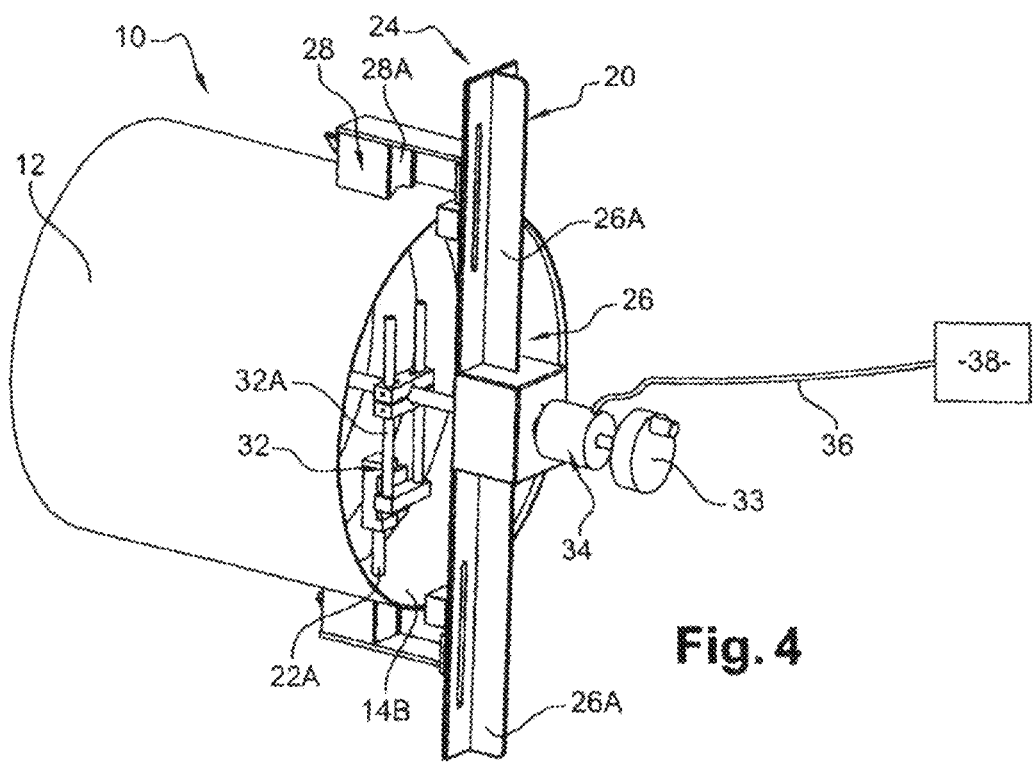
FIG. 4 represents a perspective view of the measuring device of FIG. 1 in a second configuration of the measuring device.

In contrast, in the second measurement configuration illustrated in FIG. 4, the sensor 22 is mounted directly on the first portion 32A. The axial position of this first portion 32A is preferably adjustable along the rotary shaft 30.

The arm 32 is formed, for example, by a set of plates and rods which are assembled together. In particular, it will be seen that the first portion 32A of the arm 32 is formed by two rods and is fixed to the shaft via a pair of plates, each plate comprising two through holes for each of the rods and a central groove configured such that the two plates clamp the rotary shaft in the space formed by the two grooves. Clearly, other forms and types of elements could be used to produce the arm.

The first sensor 22 may also be displaced axially along the tubular component 12 to make measurements of the contour of the tubes in several successive measurement planes along the principal axis Z. Further, the position of the sensor 22 may also be adjusted in a radial direction, on the one hand to allow the measuring device 20 to be adapted to different diameters in existing tubular components, but also to allow the device to be adapted as a function of axial variations in the internal 14B or external 14A profile of an individual component to be inspected, especially to accommodate any taper in the tubular component B.

Further, the device 20 comprises a second sensor 34 for measuring an angular position of the first sensor 22 for each radial measurement of the first sensor 22. The radial and angular measurements of the first 22 and second 34 sensors mean that the profile of the component 10 in the pre-defined plane P can be completely defined in polar coordinates. This second sensor 34 comprises, for example, a fixed element 34A which is integral with the principal body of the device 10 and an element 34B which is mobile with respect to said fixed element 34A, integral to the rotary shaft 30. Thus, the second sensor 34 is preferably a rotary encoder. The movable element 34B is a disk integral to the shaft 30, for example.

Furthermore, the first 22 and second 34 measuring sensors are connected to control means (not shown) that can guide the sensors so that they make synchronized radial and angular measurement at a pre-defined acquisition frequency. As an example, the acquisition period for the measurements may be in the range 1 millisecond to 1 second.

Further, in order to allow an analysis of the results, the device 20 comprises means 36 for communication with a unit 38 for computing a two-dimensional internal or external profile from the radial and angular measurements. These communication means 36 are wires, for example. However, in a variation, the communication means 36 may be of a wireless type.

The radial measurements R1 to Rn and the corresponding angular measurements θ1 to θn mean that the measured points M1 to Mn are completely defined in the plane P in polar coordinates. Thus, it is possible to determine the two-dimensional profile of the tubular component. The origin of this set of polar coordinates is the reference for the "P0" measurements in FIG. 5.

The ovality is determined from measurements taken after one complete turn about the pre-defined circular trajectory by the following calculations with reference to the diagrammatic graphic of FIG. 5.

In particular, the position of the central point of the internal or external profile of the component, denoted O(x,y) is determined from a number n of measurement points Mi(ri, θi) as follows, by assimilating said central point into the barycentre of the points Mi of the internal or external profile:

$$O(x) = \sum_{i=1}^{n} \frac{xi}{n}$$

where $xi = r_i(\theta_i) \cos \theta_i$, θ being from 0° to 360°

$$x = r(\theta)\cos \theta$$

$$O(y) = \sum_{i=1}^{n} \frac{yi}{n}$$

where $yi = r_i(\theta)\sin \theta_i$,
$y = r(\theta)\sin \theta$

Further, the characteristics of the oval are determined by finding a minimum diameter (Dmin) and a maximum diameter (Dmax):

$D\mathrm{min} = \mathrm{Min}(r_i(\theta) + r_i(\theta+\pi))$ $D\mathrm{max} = \mathrm{Max}(r_i(\theta) + r_i(\theta+\pi))$ The ovality is deduced from the formula:

$$\text{Ovality} = \|D\text{min} - D\text{max}\|$$

We shall now describe the principal steps in a method for measuring a profile of a tubular component 12 using the device 20 of the invention. In the figures, we have shown a step in measuring an external profile of a tubular component 12. Clearly, the method is also applicable to measuring an internal profile (FIG. 4). In this case, in contrast to the illustrations in the preceding figures, the clamping lugs 28A can clamp the component 12 onto an external profile 14A of the tube, as can be seen in FIG. 4.

During a first step, an operator preferably fixes the principal body 26 of the device 20 to the internal end border of a calibration component in order to initialize the sensor 22 at a reference value. Next, during a second step, the operator attaches the principal body of the device 20 to the component 12 using the releasable attachment means 28. As an example, the body 24 can be attached to the internal border by internal clamping to the inside of the tubular component 12. Thus, the clamping lugs 28A of the attachment means 28 are placed flush against the internal wall of the tubular component 12.

Further, during this second step, the operator positions the body 26 in a similar manner so that the rotary shaft 30 substantially coincides with the principal axis Z of the tubular component 12. One of the advantages of the invention is that non-alignment of the axes of the device and the component is of no consequence when computing the diameters and the ovality, as can be seen from the above computation formulae. This means that there is great flexibility in using the device, in particular in terms of tolerances when positioning the measuring device.

Next, during a third step, the operator rotates the shaft 30, for example using the crank 33. This means that the arm 32 carrying the sensor 22 and the rotary disk 34B of the second sensor 34 can be rotated. Prior to this step, the operator defines a measurement period, for example 10 ms, the number of measurement points then being directly linked to this pre-defined measuring period and to the time taken for one turn.

This third step means that a plurality of radial measurements can be taken as a function of the angle of the tubular component 12. The number of measurement points in this example is defined by the frequency of acquisition and the time taken for one turn. As an example, for a rotational period of 20 seconds and an acquisition period of 10 ms, the device can acquire 2000 measurement points.

Figure 6:
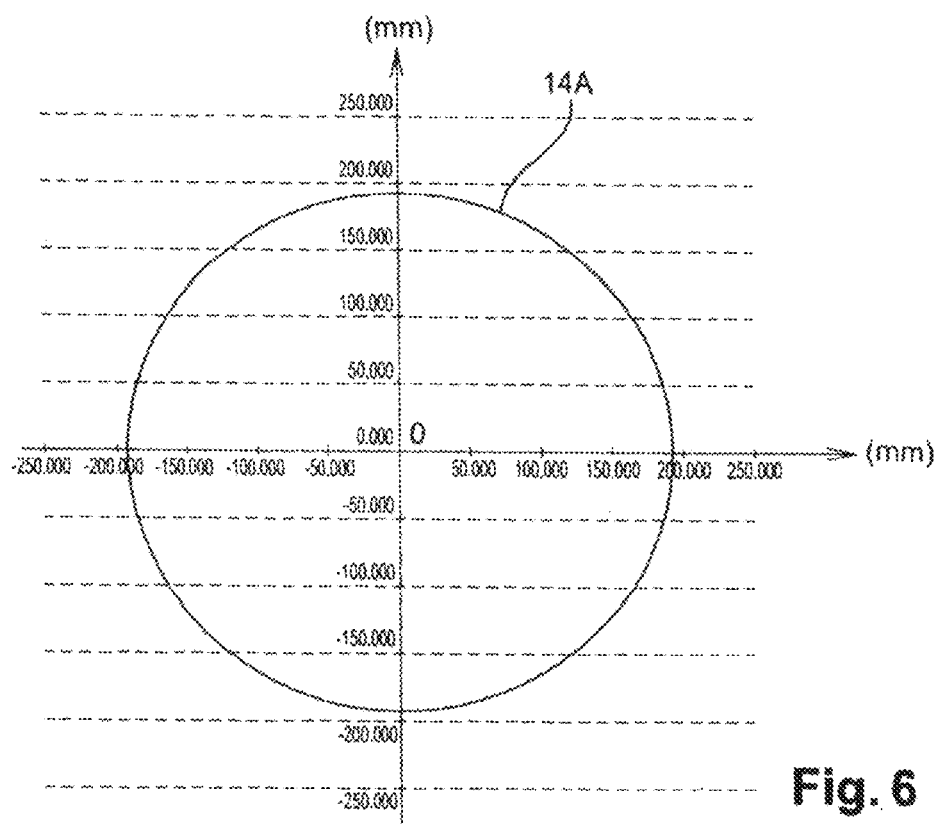
FIG. 6 is a graph of the results showing the contour of the external profile of a tubular component obtained from the measuring device of the invention.

During a final step, processing means are used to compute, by applying the computations described above, the external profile 14A of the tubular component 12 in the axial plane P measuring from the radial and angular measurements that have been collected. Thus, the graph of FIG. 6 is obtained, which represents the external profile 14A of the tubular component 12. This external profile 14A is centred on the central point "O" determined in accordance with the computations described above. The results of processing these measurements were as follows:

Dmin=387.949 mm
Dmax=388.142 min
Theoretical diameter=388.055 mm
Ovality=‖Dmin−Dmax‖=0.193 mm In this example, the ovality was considered to be acceptable and the component was not rejected. This series of measurements is repeated in, for example, four different axial planes in order to ensure that the component is within the pre-defined tolerances in the three other planes as well.

Further, and preferably, from the series of measurements obtained in different planes, a digital model or the internal or external profile of the tubular component can be obtained using a computer program and a finite element computation is carried out on the digital model to determine the behaviour of the component as a function of at least one physical constraint. The computer program is, for example, a computer aided design (CAD) program.

Clearly, other embodiments may be envisaged without departing from the scope of the invention. Thus, the skilled person may make various modifications to the invention which has been described here by way of example.

The invention claimed is:

1. A device for measuring an external or internal profile of an end portion of a tubular component, comprising:
    a first sensor for making a radial measurement of the tubular component with respect to a pre-defined reference;
    a support which can drive the first sensor in a circular trajectory in a predefined plane orthogonal to the principal axis of the component, wherein the support comprises a principal body that can be attached to the component via a releasable attachment means and a shaft which is movable in rotation with respect to the body on which an arm carrying the first sensor is attached to allow displacement of the first sensor in a circular trajectory inside or about the tubular component, wherein the arm is configured to allow adjustment of the first sensor in axial and radial translation; and
    a second sensor for measuring an angular position of the first sensor for each radial measurement of the first sensor, the radial and angular measurements of the first and second sensors allowing the profile of the component in the pre-defined plane to be determined.

2. The device according to claim 1, wherein the first sensor is of contact or contactless type, or of inductive type, or of optical detection type.

3. The device according to claim 1, further comprising actuating means of crank type to drive the shaft in rotation.

4. The device according to claim 1, wherein the principal body comprises an upright along which a position of the releasable attachment means can be adjusted.

5. The device according to claim 4, wherein the releasable attachment means comprises clamping lugs configured to clamp the component on an inside or outside.

6. The device according to claim 1, further comprising means for communicating with a unit for computing a two-dimensional profile from radial and angular measurements respectively provided by the first and second sensors.

7. The device according claim 1, wherein the second sensor comprises a first fixed element which is integral with the principal body and a second element which is mobile in rotation with respect to the first element and which is mounted on the rotary shaft.

8. The device according to claim 7, wherein the second sensor is a rotary encoder.

9. A method for measuring an internal or external profile of a tubular component using a device in accordance with claim 1, comprising:
    fixing the principal body of the support for the device to the component using the releasable attachment means such that the shaft substantially coincides with the principal axis of the tubular component;
    rotating the shaft to collect a plurality of radial measurements of the internal or external profile of the tubular component and a plurality of angular measurements corresponding to the plurality of radial measurements;
    computing the internal or external profile of the tubular component using the collected radial and angular measurements.

10. The method according to claim 9, wherein a series of measurements is produced in a plurality of planes along the principal axis of the tubular component.

11. The method according to claim 10, wherein, starting from the series of measurements obtained in different planes, a digital model of the internal or external profile of the tubular component is produced using a computer program, and a finite element computation is carried out on the digital model to determine a behaviour of the component as a function of at least one physical constraint.

* * * * *